Patented Sept. 30, 1930

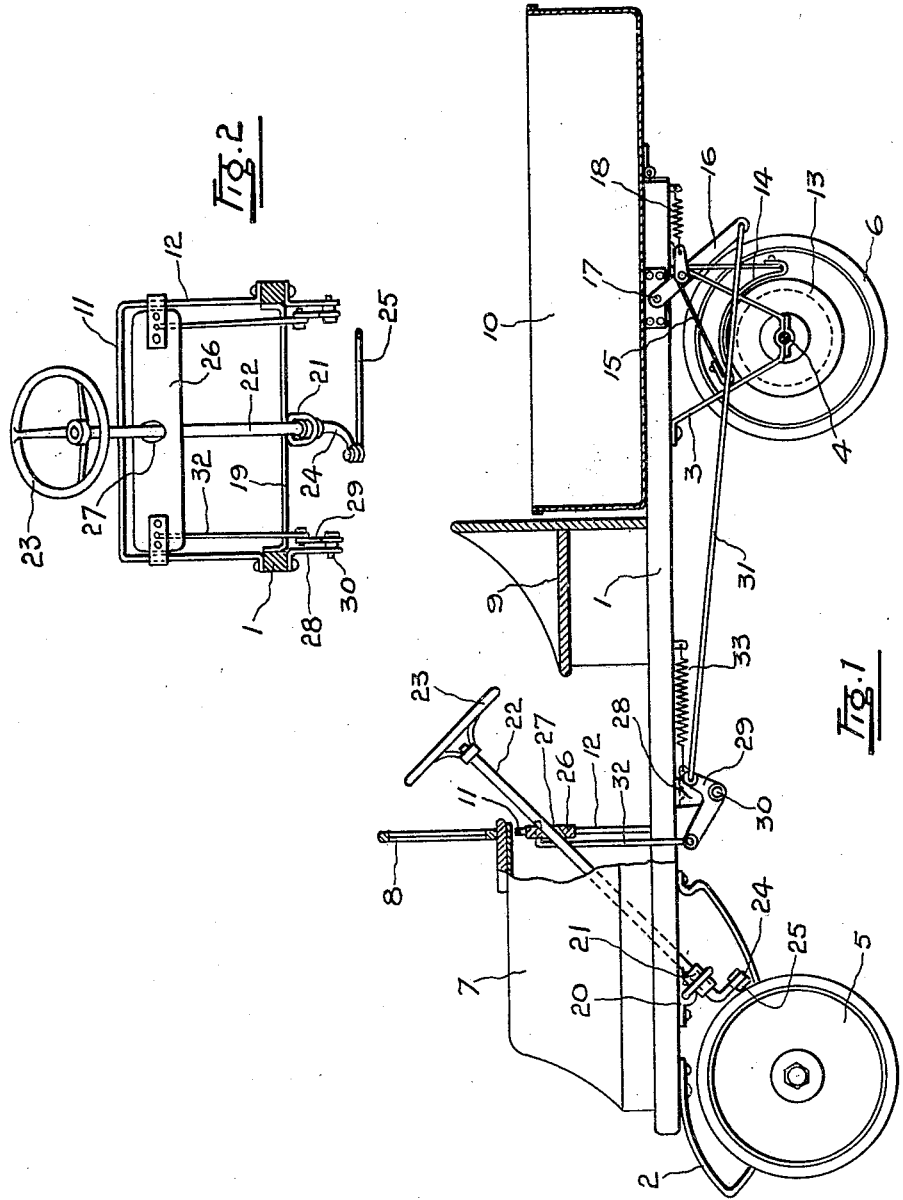

1,777,237

UNITED STATES PATENT OFFICE

WILLIAM THOMAS WATSON, OF VANCOUVER, BRITISH COLUMBIA, CANADA

WHEELED TOY

Application filed April 18, 1928. Serial No. 271,005.

My invention relates to improvements in wheeled toys which are particularly adapted for toys of the automobile class and such others as may be fitted with a steering column. The object of the invention is to provide a novel method of applying one or more brakes to the wheels of the toy through the medium of the said steering column whereby the need for foot pedals, levers and the like is entirely eliminated. A further object is to provide such an arrangement of the connecting parts that ample freedom exists for access to pedals or any other propelling mechanism which may be fitted to the vehicle.

The invention consists essentially of a vehicle having forward and rear wheels and brakes adapted to be applied to the rear wheels, which are substantially similar to those described in my application for patent in the United States of America, filed June 6th, 1927, under Serial Number 196,932, and a steering column for turning the steering wheels and for applying said brakes to the rear wheels, as will be more fully described in the following specification and shown in the accompanying drawings, in which:—

Fig. 1 is a part longitudinal section of the invention.

Fig. 2 is a fractional transverse section showing the method of equalizing the tension on the brakes.

In the drawings like characters of reference indicate corresponding parts in each figure.

The numeral 1 indicates generally a toy motor car frame mounted on brackets 2 and 3 to which a front axle (not shown) and a rear axle 4 is secured. The front axle is fitted with steering knuckles and a distance rod in the usual way and upon the steering knuckles front wheels 5 are freely rotatable.

To the rear axle 4 road wheels 6 are fitted which are preferably driven by any suitable pedal mechanism, though this is not essential if the toy is to be used primarily for coasting. Mounted upon the frame 1 is an engine hood 7 having a windshield 8, a driving seat 9 and a truck box 10. Surrounding the rear edge of the hood 7 is a rod 11 in the form of an inverted U having vertical members 12, the purpose of which will hereinafter appear. Each rear wheel is fitted with a brake drum 13 which is adapted to be engaged by a flexible brake shoe 14 carried by a V-shaped yoke 15, which in turn is pivotally mounted on a swinging arm 16 fulcrumed from the frame as at 17 and normally held out of engagement with the brake drum 13 by a tension spring 18. A member 19, see Figure 2, extends transversely of the frame 1, under which an eyed bracket 20 supporting a swinging bearing 21 is fitted. A steering column 22 having a steering wheel 23 at its upper extremity is journalled in the bearing 21 so as to permit the column to rotate and also be moved about a horizontal axis with the eyed bracket 20 as its centre. At the foot of the column 22 is a radial arm 24 which is connected to one of the steering knuckles of the front wheels 5 by a rod 25, so that rotary movement imparted to the steering wheel 23 imparts corresponding steering movement to the wheels 5 in the manner usually adopted in toys of this type.

Slidably mounted between the upright members 12 of the U-shaped rod 11 is a dash board 26 which is provided with a central aperture 27 through which the upper portion of the steering column 22 extends. A pair of brackets 28 are fitted under opposite sides of the frame 1, upon which bell cranks 29 are pivotally mounted as at 30.

The rear leg of each bell crank 29 is connected by a rod 31 to an arm 16 and the forward leg thereof is connected to an end of the dash or equalizer 26 by a vertical rod 32. Tension springs 33 are fitted to the rear leg of each of the bell cranks 29, which are anchored to the frame 1 for the purpose of drawing the bell cranks in a clockwise direction and for supporting the dash 26 in elevated or normal position.

Having thus described the several parts of my invention I will now briefly explain its use.

Rotational movement imparted to the steering wheel 23 will impart a turning movement to the front wheels 5 in the usual way. When it is desired to apply the brakes 14 to the brake drums 13 of the rear wheels 6 the steering wheel 23 is drawn downwards toward the driver of the vehicle, the motion thus imparted to the wheel 23 and its column 22 depresses the dash or equalizer 26 and the rods 32, rocking the bell cranks 29 in an anti-clockwise direction and pulling the rods 31 forwardly of the vehicle. These rods being connected to the arms 16 draw them forwardly and thrust the brake shoes 14 to the drums 13.

When the downward strain is removed from the steering wheel, the springs 32 rock the bell cranks 29 in a clockwise direction and restores the dash 26 and the column 22 to their normal raised positions.

It will thus be seen that I have invented a braking system for toy vehicles employing a steering wheel which enables the user to effectively apply his brakes without removing his hands from the said steering wheel.

What I claim as my invention is:

1. The combination of a wheeled vehicle having dirigible front wheels controlled by a steering wheel and column, and rear wheels each adapted to be controlled by a brake, said steering column being pivotally mounted adjacent its lower end and journalled adjacent is upper end in a transverse member capable of vertical movement, means operatively connecting each brake with the transverse member whereby the downward swinging movement of the column depresses the transverse member and applies the brakes to the rear wheels.

2. The combination of a wheeled vehicle having dirigible front wheels controlled by a steering wheel and column, and rear wheels each adapted to be controlled by a brake, said steering column being pivotally mounted adjacent its lower end, and journalled adjacent its upper end in a transverse member capable of vertical and oscillating movement, means operatively connecting each of the brakes to the transverse member on opposite sides of the column whereby the swinging movement of the column depresses the transverse member to apply the brakes and the oscillating movement of the transverse member serves to equalize the pressure applied by each of the brakes.

3. The combination with a wheeled vehicle having dirigible front wheels controlled by an inclined steering wheel and column, and rear wheels each adapted to be controlled by a brake, said steering column being pivotally mounted adjacent its lower end and journalled in a vertically movable transverse dashboard adjacent its upper end, operative connection between each end of the dashboard and a brake whereby the depression of the steering column moves the dashboard in a downward direction and applies the brakes to the rear wheels and spring means for returning the dashboard to normal position.

Dated at Vancouver, B. C., this 4th day of April, 1928.

WILLIAM THOMAS WATSON.